US008285306B2

(12) United States Patent
Ni

(10) Patent No.: US 8,285,306 B2
(45) Date of Patent: Oct. 9, 2012

(54) LOCATION SERVER, LOCATION CONTROLLER, METHOD AND SYSTEM FOR IMPLEMENTING LOCATION-BASED SERVICE

(75) Inventor: Hui Ni, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 12/902,471

(22) Filed: Oct. 12, 2010

(65) Prior Publication Data

US 2011/0028165 A1 Feb. 3, 2011

Related U.S. Application Data

(63) Continuation of application No. PCT/CN2009/070804, filed on Mar. 16, 2009.

(30) Foreign Application Priority Data

Apr. 23, 2008 (CN) .......................... 2008 1 0095521

(51) Int. Cl.
*H04W 24/00* (2009.01)
(52) U.S. Cl. .................... 455/456.2; 455/456.1; 455/457
(58) Field of Classification Search .... 455/456.1–456.2, 455/457
See application file for complete search history.

(56) References Cited

U.S. PATENT DOCUMENTS

| 2004/0132465 | A1* | 7/2004 | Mattila et al. ............. | 455/456.1 |
|---|---|---|---|---|
| 2004/0160909 | A1 | 8/2004 | Sheynblat | |
| 2004/0185865 | A1* | 9/2004 | Maanoja .................... | 455/452.2 |
| 2004/0259566 | A1* | 12/2004 | Maanoja et al. ........... | 455/456.1 |
| 2005/0148340 | A1 | 7/2005 | Guyot | |
| 2006/0099960 | A1 | 5/2006 | Duan | |
| 2006/0239205 | A1* | 10/2006 | Warren et al. .................. | 370/254 |
| 2007/0217379 | A1 | 9/2007 | Fujiwara et al. | |
| 2008/0207217 | A1* | 8/2008 | Ramanathan et al. ..... | 455/456.1 |
| 2008/0242374 | A1* | 10/2008 | Alexander ................. | 455/575.1 |
| 2011/0136500 | A1* | 6/2011 | Sung et al. ................. | 455/456.1 |

FOREIGN PATENT DOCUMENTS

CN 1411289 4/2003

(Continued)

OTHER PUBLICATIONS

International Search Report, mailed Jun. 25, 2009, in corresponding International Application No. PCT/CN2009/070804 (4 pp).

(Continued)

*Primary Examiner* — Jean Gelin
*Assistant Examiner* — Tangela T. Chambers
(74) *Attorney, Agent, or Firm* — Staas & Halsey LLP

(57) ABSTRACT

A location server, a location controller, a method and a system for implementing a location-based service are provided. The method includes: receiving a location data request sent by a client; sending a location request message including QoS requirement information to a location controller; sending location information to the client according to a location response returned by the location controller, where the location response includes location measurement information. The location server does not need to directly transmit QoS requirement values sent by the client, but satisfies the service having no specific requirements for QoS of a location result by determining the sent QoS requirement information flexibly. The network can determine the QoS of the location result according to its own location capability. In this way, the network location capability is fully utilized, and at the same time flexibility of a location service QoS requirement is improved.

19 Claims, 12 Drawing Sheets

FOREIGN PATENT DOCUMENTS

| | | |
|---|---|---|
| CN | 1585313 | 2/2005 |
| JP | 2006-518154 | 8/2006 |
| JP | 2007-527659 | 9/2007 |
| JP | 2007-534180 | 11/2007 |

OTHER PUBLICATIONS

WiMAX Network Protocols and Architecture of Location Based Services, Part of Network Release 1.5, Nov. 2007, pp. 1-50.

Office Action, mailed Aug. 2, 2010, in corresponding Chinese Application No. 200810095521.4.

Written Opinion of the International Searching Authority of Jun. 25, 2009 in corresponding international application No. PCT/CN2009/070804 (4 pages).

Notice of Reasons for Rejection, mailed Jul. 24, 2012, in corresponding Japanese Application No. 2011-505352 (5 pp.).

\* cited by examiner

LOCATION SERVER, LOCATION CONTROLLER, METHOD AND SYSTEM FOR IMPLEMENTING LOCATION-BASED SERVICE

CROSS-REFERENCE TO RELATED APPLICATIONS

The application is a continuation of International Application No. PCT/CN2009/070804, filed on Mar. 16, 2009, which claims priority to Chinese Patent Application No. 200810095521.4, filed on Apr. 23, 2008, both of which are hereby incorporated by reference in their entireties.

FIELD OF THE TECHNOLOGY

The present invention relates to the field of communications technologies, and more particularly, to a location server, a location controller, method and system for implementing a location-based service.

BACKGROUND OF THE INVENTION

In the mobile telecommunications network, the demands for value-added services based on user location information, such as map navigation and localized advertisement, are ever increasing. A value-added service provider can provide more localized and more personalized service content to a user according to the location information provided by the network. It can be known from the above description that, in order to implement the value-added services, the mobile telecommunications network is required to have the capability of locating a user terminal.

The Worldwide Interoperability for Microwave Access (WiMAX) defines the architecture of a Location-based Service (LBS). When a location-based service is implemented in the architecture, a client usually specifies the required Quality of Service (QoS) when the client sends a location request to a location server (LS), and the QoS may include the location precision and location delay. The location delay is a time interval between sending a location request and receiving a location result, and is used for guaranteeing the time effectiveness of the location result. The location precision includes horizontal precision and vertical precision, and is used for guaranteeing the accuracy of the location result.

During research on the prior art, the inventor finds that in the implementation of a location-based service, usually a client sends a location data request to an LS. The location data request includes specific QoS requirement values such as the horizontal precision, the vertical precision and the location delay. The LS obtains the location result by interacting with a location controller (LC). If the location result does not satisfy the QoS requirement values, the LS will not send the location result to the client, but return a location failure indication only. However, for a service that does not have specific QoS requirements for the location result, if a map location service with the highest possible precision is provided to a user terminal, the above method will make the network unable to determine the QoS of the location result according to its own location capability. Furthermore, because the network location capability is also affected by many factors, such as the distribution density of base stations (BSs) or the blockage of buildings, the location can be successful only when the QoS requirement is lower than the location capability of the network. It can be seen that, the location-based service cannot fully utilize the location capability of the network, and the location process for implementing a location service QoS request lacks flexibility.

SUMMARY OF THE INVENTION

The present invention is directed to a location server, a location controller, a method and a system for implementing a location-based service, so that location capability of a network is utilized fully, and flexibility of a QoS request is improved.

In order to achieve the objectives of embodiments of the present invention, in the embodiments, the present invention provides the following technical solutions.

A method for implementing a location-based service includes:
 receiving a location data request from a client;
 sending a location request message including QoS requirement information to a location controller; and
 sending location information to the client according to a location response returned by the location controller, where the location response includes location measurement information.

A system for implementing a location-based service includes a client, a location server, and a location controller.

The client is configured to send a location data request to the location server.

The location server is configured to: send, after receiving the location data request sent by the client, a location request message including QoS requirement information to the location controller; and send location information to the client according to a location response returned by the location controller, where the location response includes location measurement information.

The location controller is configured to perform location measurement on a corresponding terminal according to a location request, and return the location response including the location measurement information to the location server.

A location server includes a request receiving unit, a request sending unit, and an information sending unit.

The request receiving unit is configured to receive a location data request sent by a client.

The request sending unit is configured to send a location request message including QoS requirement information to a location controller.

The information sending unit is configured to send location information to the client according to a location response returned by the location controller, where the location response includes location measurement information.

A location controller includes a request receiving unit, a location measurement unit, and a response returning unit.

The request receiving unit is configured to receive a location request sent according to determined QoS requirement information.

The location measurement unit is configured to perform location measurement on a corresponding terminal according to the location request.

The response returning unit is configured to return a location response including location measurement information to a location server.

It can be seen from the technical solutions provided in the embodiments of the present invention that, after receiving a location data request sent by a client, a location server determines QoS requirement information, sends a location request to a location controller according to the QoS requirement information, and sends location information to the client according a location response returned by a location controller, where the location response includes location measurement information. With the application of the embodiments of the present invention, because the location request message can use more flexible QoS requirement information, service demands that have no specific requirements for QoS of the location result are satisfied. The QoS of the location result can be determined according to the location capability of the network. In this way, the network location capability is fully utilized, and the flexibility of a location service QoS request is improved.

DETAILED DESCRIPTION OF THE EMBODIMENTS

In the embodiments, the present invention provides a location server, a location controller, a method and a system for implementing a location-based service. After receiving a location data request sent by a client, the location server determines QoS requirement information, sends a location request to the location controller according to the QoS requirement information, and sends location information to the client according to a location response returned by the location controller, where the location response includes location measurement information.

Figure 1:
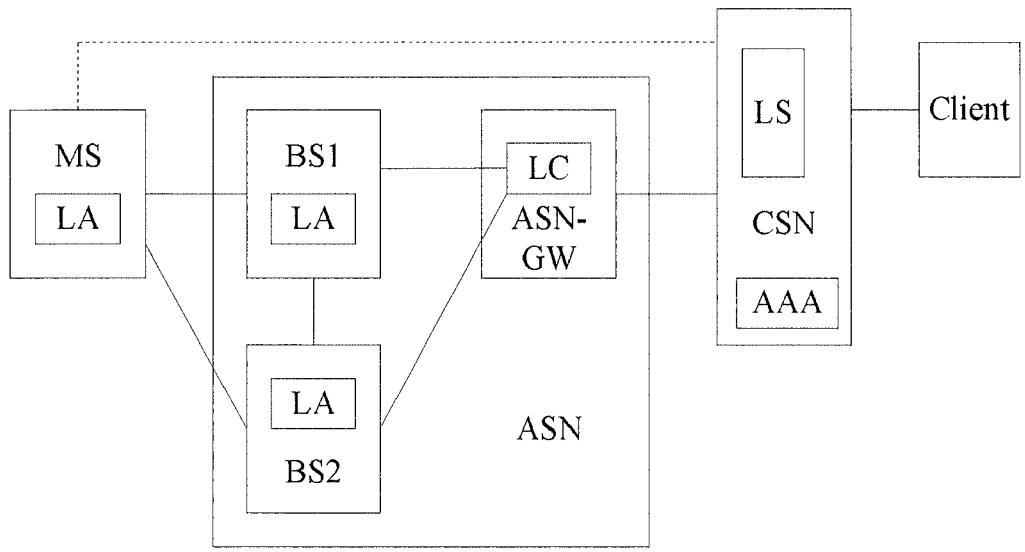
FIG. 1 is a schematic view of the networking structure of a location-based service (LBS)

In the embodiments of the present invention, the implementation of a location-based service is based on an LBS structure. The structure, as shown in FIG. 1, is for providing the location of a user (terminal) to a location-based service. The Access Service Network (ASN), being an aggregation of a group of functional entities, is configured to provide wireless access for the WiMAX user terminals. The ASN includes multiple Access Service Network Gateways (ASN-GWs) and Base Stations (BSs). The BSs are connected to mobile stations (MSs) and ASN-GWs respectively. The ASN-GWs are connected to the Connectivity Service Network (CSN). The CSN is a group of functional entities configured to provide IP connections and services to users. The CSN is connected to clients. The clients are external clients, terminals or other internal functional entities that send location requests. Furthermore, the CSN includes a location server (LS) and Authentication Authorization Accounting (AAA). The LS is configured to provide a network location function interface to a client, receive a location request from the client, and provide obtained location information of a user terminal in the network to the client. The AAA is configured to authenticate a service according to subscription data and policies of an operator, and provide corresponding accounting capability. The ASN-GW includes a location controller (LC), and is configured to obtain location information of a user terminal and report the location information of the user terminal to the LS. The BS or user terminal includes a location agent (LA), and is configured to measure location information of the user terminal according to the location measurement instruction of the LC and return a measurement result to the LC.

Figure 2:
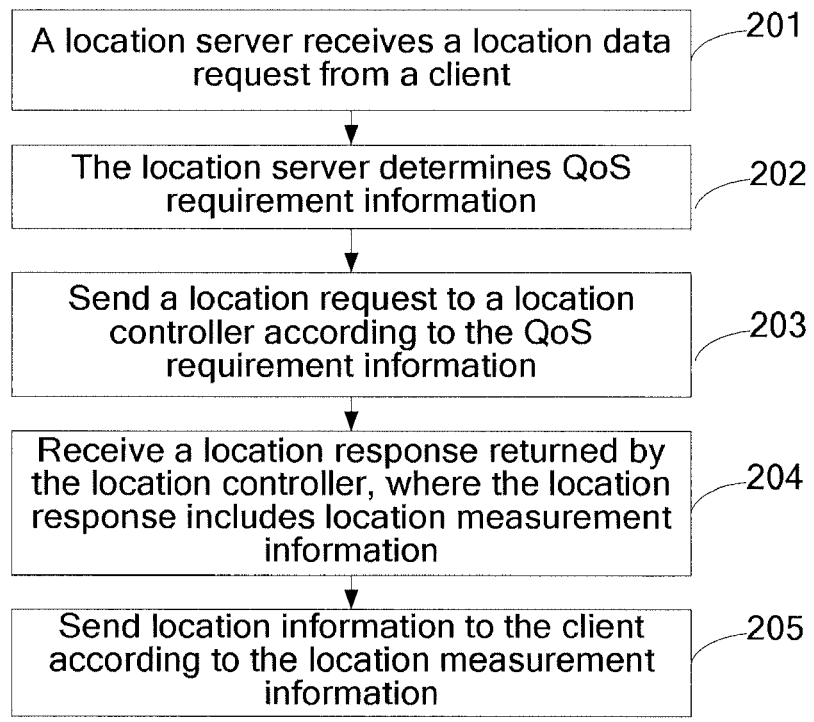
FIG. 2 is a flow chart of a method for implementing a location-based service according to an embodiment of the present invention.

FIG. 2 is a flow chart of a method according to an embodiment of the present invention.

In step 201, a location server receives a location data request from a client.

In step 202, the location server determines QoS requirement information.

Specifically, the location server may obtain the QoS requirement information according to the location data request, where the location data request includes the QoS requirement information. The location server may also generate the QoS requirement information according to service characteristics of the client, subscription information of a terminal or the location capability of the network.

The QoS requirement information includes at least one of the following items: QoS requirement values, QoS requirement ranges, and QoS classes. The QoS requirement values may be at least one of: a vertical precision value, a horizontal precision value and a delay value. The QoS requirement ranges include lower limits of the QoS, or include the lower limits and upper limits of the QoS. The QoS classes include best effort QoS class and guaranteed QoS class.

In step 203, a location request is sent to a location controller according to the QoS requirement information.

The location server may directly send the location request to the location controller, or use other network elements to forward the location request to the location controller.

In step 204, a location response returned by the location controller is received, where the location response includes location measurement information.

The location controller may directly return the location response including the location measurement information to the location server, or use other network elements to return the location request including the location measurement information to the location server.

In step 205, location information is sent to the client according to the location measurement information.

In order to make persons skilled in the art understand the technical solutions provided in the embodiments of the present invention better, the technical solutions provided in the embodiments of the present invention will be further described in detail in the following with reference to the schematic view of the networking structure shown in FIG. 1.

Figure 3:
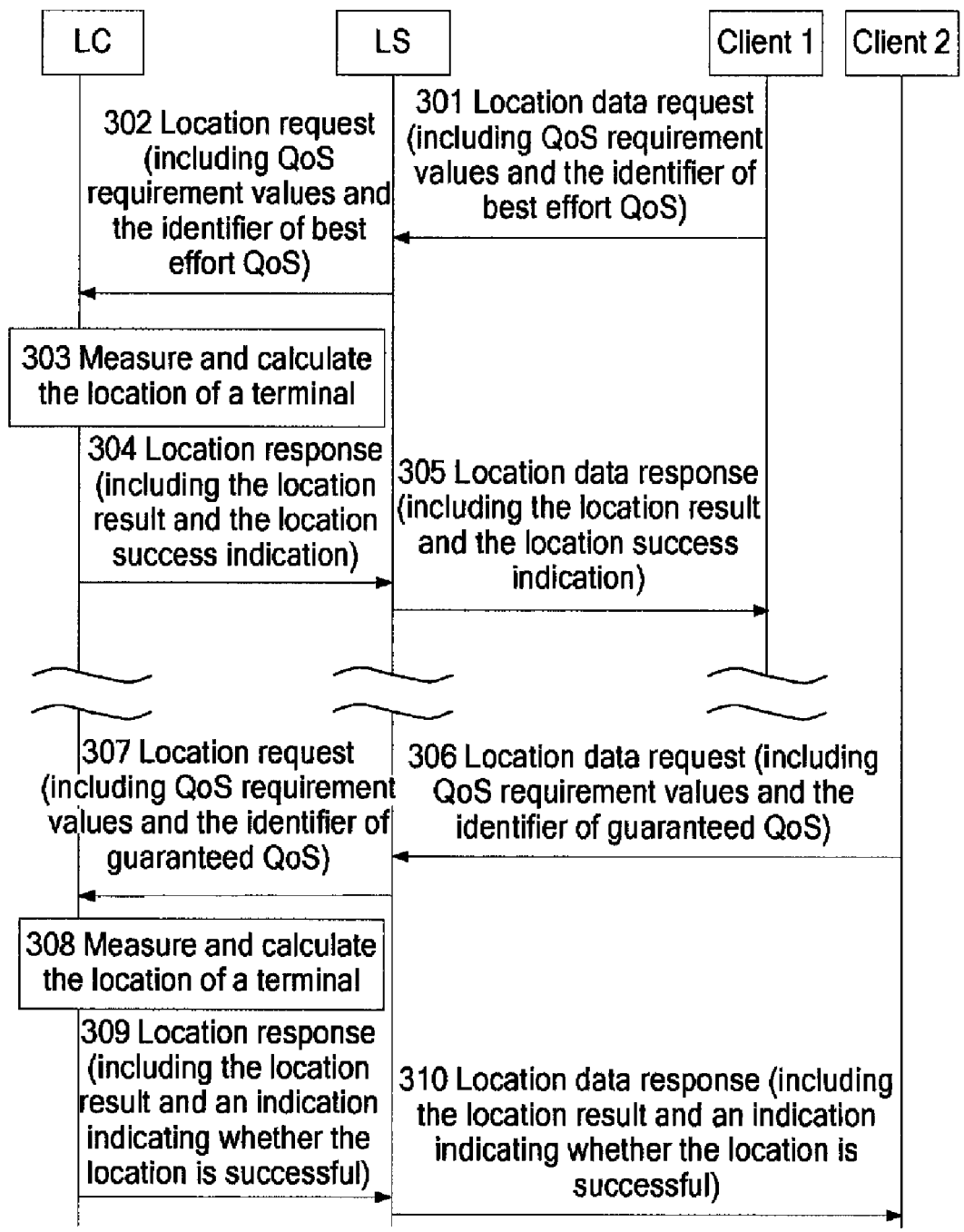
FIG. 3 is a flow chart of a method for implementing a location-based service according to another embodiment of the present invention.

FIG. 3 is a flow chart of a method according to another embodiment of the present invention. The embodiment shows the process that an LS receives QoS requirements sent by a client, the class of the QoS requirements may be the best effort QoS requirement or guaranteed QoS requirement, the value of the requirement class covers all QoS options, and the LS sends the QoS to an LC.

In step 301, a client 1 sends a location data request, which indicates that the location of a designated terminal is desired, to the LS. The location data request includes the QoS requirement values and an identifier of the best effort QoS. The QoS requirement values include multiple QoS options (such as the vertical precision and the horizontal precision), and the identifier of the best effort QoS indicates that if the network location cannot meet the QoS requirement values, location results with other QoS can be returned.

In step 302, the LS sends a location request to the LC, where the location request includes the QoS requirement values and the identifier of the best effort QoS in the location data request.

In step 303, the LC selects a location method according to the QoS requirement values, triggers the network to perform location measurement towards a designated terminal, and obtains the measurement data and the location result.

In step 304, the LC sends a location response to the LS, where the location response includes the location result and a location success indication. Because the QoS requirement class is the best effort QoS, even if the location result fails to meet the QoS requirement values, the location is also deemed as successful.

In step 305, the LS sends a location data response to the client 1, where the location data response includes the location result and the location success indication.

In step 306, a client 2 sends a location data request, which indicates that the location of a designated terminal is desired, to the LS, where the location data request includes QoS requirement values and an identifier of the guaranteed QoS. The QoS requirement values include multiple QoS options, and the identifier of the guaranteed QoS indicates that if the network location cannot meet the QoS requirement value, a location failure indication is returned.

It should be noted that, the execution order between step 305 and step 306 is not limited, and they are numbered as 305 and 306 just for illustrating the location of different clients. That is, the location process of the client 1 is from step 301 to step 305, and the location process of the client 2 is from step 306 to step 310.

In step 307, the LS sends a location request to the LC, where the location request includes the QoS requirement values and the identifier of the guaranteed QoS in the location data request.

In step 308, the LC selects a location method according to the QoS requirement values, triggers the network to perform location measurement towards a designated terminal, and obtains the measurement data and the location result.

In step 309, the LC sends a location response to the LS, where the location response includes the location result and an indication indicating whether the location is successful. Because the QoS requirement class is the guaranteed QoS, if the location result meets the QoS requirement values, a location success indication is returned; if the location result fails to meet the QoS requirement values, a location failure indication is returned.

In step 310, the LS sends a location data response to the client 2, where the location data response includes the location result and an indication indicating whether the location is successful.

Figure 4:
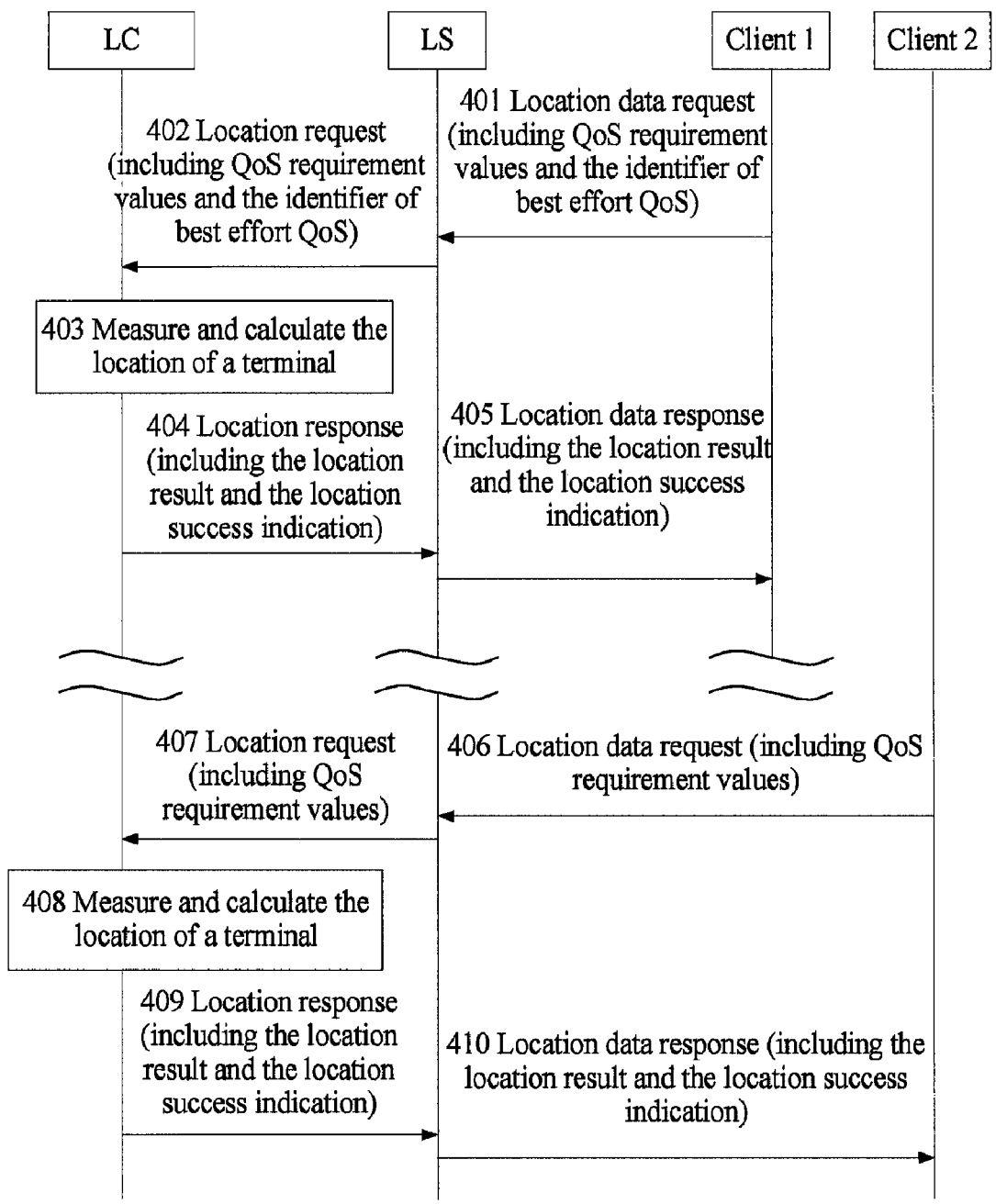
FIG. 4 is a flow chart of a method for implementing a location-based service according to another embodiment of the present invention.

FIG. 4 is a flow chart of a method according to another embodiment of the present invention. In the embodiment, an LS receives QoS requirements sent by a client, the class of the QoS requirements may be the best effort QoS requirement or the guaranteed QoS requirement, and each QoS requirement class covers all QoS options. When a class identifier is not included in the QoS requirement, either of the two classes can be the default class. For ease of description, FIG. 4 shows the process that a QoS requirement without the class identifier is considered as the guaranteed QoS requirement by default, and the LS sends the QoS to an LC.

In step 401, a client 1 sends a location data request, which indicates that the location of a designated terminal is desired, to an LS, where the location data request includes QoS requirement values and an identifier of the best effort QoS. The QoS requirement values include multiple QoS options, and the identifier of the best effort QoS indicates that if the network location cannot meet the QoS requirement value, other QoS location results can be returned.

For ease of description, only the situation where the location data request includes the class of the QoS requirements and the class is the best effort QoS requirement is shown. Definitely, the class may also be set to the guaranteed QoS requirement according to requirements of the clients.

In step 402, the LS sends a location request to the LC, where the location request includes QoS requirement values and an identifier of the best effort QoS in the location data request.

In step 403, the LC selects a location method according to the QoS requirement values, triggers the network to perform location measurement towards a designated terminal, and obtains the measurement data and the location result.

In step 404, the LC sends a location response to the LS, where the location response includes a location result and a location success indication. Because the QoS requirement class is the best effort QoS, if the location result fails to meet the QoS requirement values, the location is also deemed as successful.

In step 405, the LS sends a location data response to the client 1, where the location data response includes the location result and a location success indication.

In step 406, a client 2 sends a location data request, which indicates that the location of a designated terminal is desired, to the LS, where the location data request includes QoS requirement values. Because the location data request does not include a class identifier, the default class is the guaranteed QoS requirement. That is, if the network location cannot meet the QoS requirement values, a location failure indication is returned; if the network location meets the QoS requirement values, a location success indication is returned.

Step 406 shows the situation where the default class is the guaranteed QoS requirement. Definitely, the default class may also be the best effort QoS requirement, and in this case, if the network location cannot meet the QoS requirement values, other QoS location results can be returned.

It should be noted that the execution order between step 405 and step 406 is not limited, and they are number as 405 and 406 just for illustrating the location of different clients.

In step 407, the LS sends a location request to the LC, where the location request includes the QoS requirement values in the location data request.

In step 408, the LC selects a location method according to the QoS requirement values, triggers the network to perform location measurement towards a designated terminal, and obtains the measurement data and the location result.

In step 409, the LC sends a location response to the LS, where the location response includes the location result and an indication indicating whether the location is successful.

Because the default QoS requirement class is the guaranteed QoS, if the network location cannot meet the QoS requirement values, a location failure indication is returned.

In step 410, the LS sends a location data response to the client 2. If the location is successful, the location data response includes the location result and a location success indication.

Figure 5:
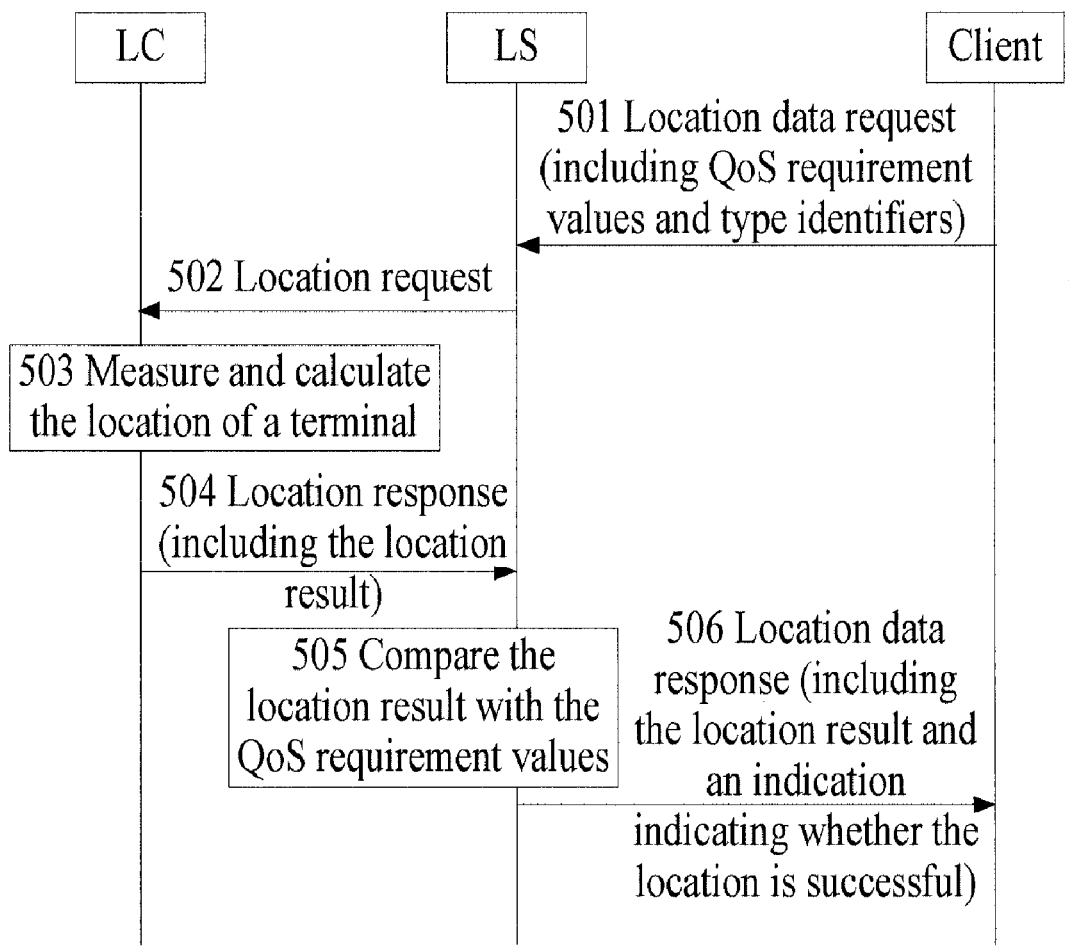
FIG. 5 is a flow chart of a method for implementing a location-based service according to another embodiment of the present invention.

FIG. 5 is a flow chart of a method according to another embodiment of the present invention. In the embodiment, an LS receives QoS requirements sent by a client, the class of the QoS requirements may be the best effort QoS requirement or the guaranteed QoS requirement, and each QoS requirement class covers all QoS options. FIG. 5 shows the process that a location request, which is sent by the LS to an LC does not include QoS requirement values or class identifier, and the LS sends a location data response to the client according to a location result returned by the LC.

In step 501, the client sends a location data request, which indicates that the location of a designated terminal is desired, to the LS, where the location data request includes QoS requirement values and class identifier. The QoS requirement values can include multiple QoS options, and the class identifier may be the identifier of the best effort QoS or the identifier of the guaranteed QoS.

In step 502, the LS sends a location request to the LC, where the location request does not include the QoS requirement values or the class identifier.

In step 503, the LC triggers the network to perform location measurement towards a designated terminal, and obtains the measurement data and the location result according to a location method that is capable of providing the highest QoS currently.

In step 504, the LC sends a location response to the LS, where the location response includes the location result. Furthermore, the location response may also include a QoS indication for indicating that the QoS requirement is satisfied when the location result is obtained, because the location request does not include the QoS requirement values. Therefore, if the LC obtains the location data successfully, it is deemed that the location meets the QoS requirement; if the location result is not obtained, the location failure indication is returned. It is assumed in the embodiment that the LC obtains the location result.

In step 505, the LS compares the received location result with the QoS requirement values.

In step 506, the LS sends a location data response to the client, where the location data response includes an indication indicating whether the location is successful. If the location is successful, the location data response further includes the location result.

According to the comparison result in step 505, the following two situations may occur. When the class identifier is the identifier of the best effort QoS, because the LS has obtained the location result, the location data response returned by the LS to the client includes the location result and the location success indication. When the class identifier is the identifier of the guaranteed QoS, if the location result meets the QoS requirement values, the location data response returned by the LS to the client includes the location result and the location success indication; if the location result does not meet the QoS requirement values, the location data response returned by the LS to the client includes the location failure indication.

Figure 6:
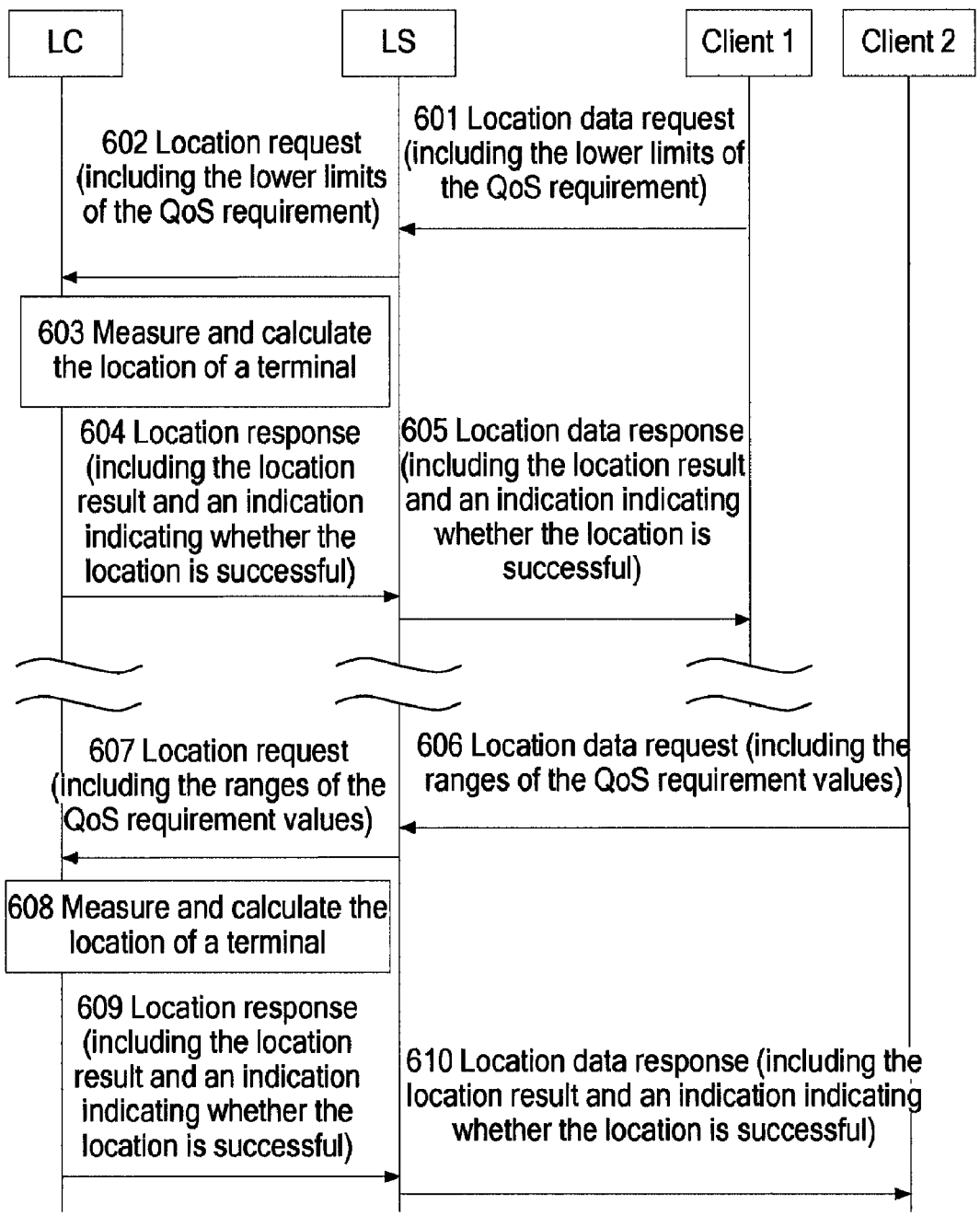
FIG. 6 is a flow chart of a method for implementing a location-based service according to another embodiment of the present invention.

FIG. 6 is a flow chart of a method according to another embodiment of the present invention. In the embodiment, an LS receives QoS range values from a client. FIG. 6 shows a process that an LC performs the location measurement according to the QoS range values sent by the LS, and the LS returns a location result to the client.

In step 601, a client 1 sends a location data request, which indicates that the location of a designated terminal is desired, to the LS, where the location data request includes a lower limit of the QoS requirement, or include multiple QoS lower limits (such as the vertical precision, the horizontal precision and the location delay). If the network cannot satisfy the lower limit of the QoS requirement, the location fails.

In step 602, the LS sends a location request to the LC. The location request includes the lower limit of the QoS requirement.

In step 603, the LC triggers the network to perform location measurement towards the designated terminal, and obtains the measurement data and the location result according to a location method that is capable of providing the highest QoS currently.

In step 604, the LC sends a location response to the LS, where the location response includes the location result and an indication indicating whether the location is successful. If the location result meets the lower limit of the QoS requirement, it is deemed that the location is successful; if the location result cannot meet the lower limit of the QoS requirement, it is deemed that the location fails.

In step 605, the LS sends a location data response to the client 1, where the location data response includes the location result and the indication indicating whether the location is successful. The location result and the indication are obtained through step 604.

In step 606, a client 2 sends a location data request, which indicates that the location of a designated terminal is desired, to the LS. The location data request includes the ranges of the QoS requirement values. The ranges include the upper limits and the lower limits of the QoS requirement. The QoS requirement values can include multiple QoS options. The upper limits of the QoS requirements are the QoS requirement values that the network needs to achieve by best effort, and the lower limits are the QoS requirement values that the network must achieve. If the lower limits cannot be satisfied, it indicates that the location fails.

It should be noted that the execution order between step 605 and step 606 is not limited, and they are numbered as 605 and 606 just for illustrating the location of different clients.

In step 607, the LS sends a location request to the LC, where the location request includes the ranges of the QoS requirement values in the location data request.

In step 608, the LC selects a location method according to the ranges of the QoS requirement values, triggers the network to perform location measurement towards the designated terminal, and obtains the measurement data and the location result.

In step 609, the LC sends a location response to the LS, where the location response includes the location result and an indication indicating whether the location is successful. If the location result meets the lower limit of the QoS requirement, it is deemed that the location is successful; if the location result cannot meet the lower limit of the QoS requirement, it is deemed that the location fails.

In step 610, the LS sends a location data response to the client 2, where the location data response includes the location result and the indication indicating whether the location is successful. The location result and the indication are obtained through step 609.

Figure 7:
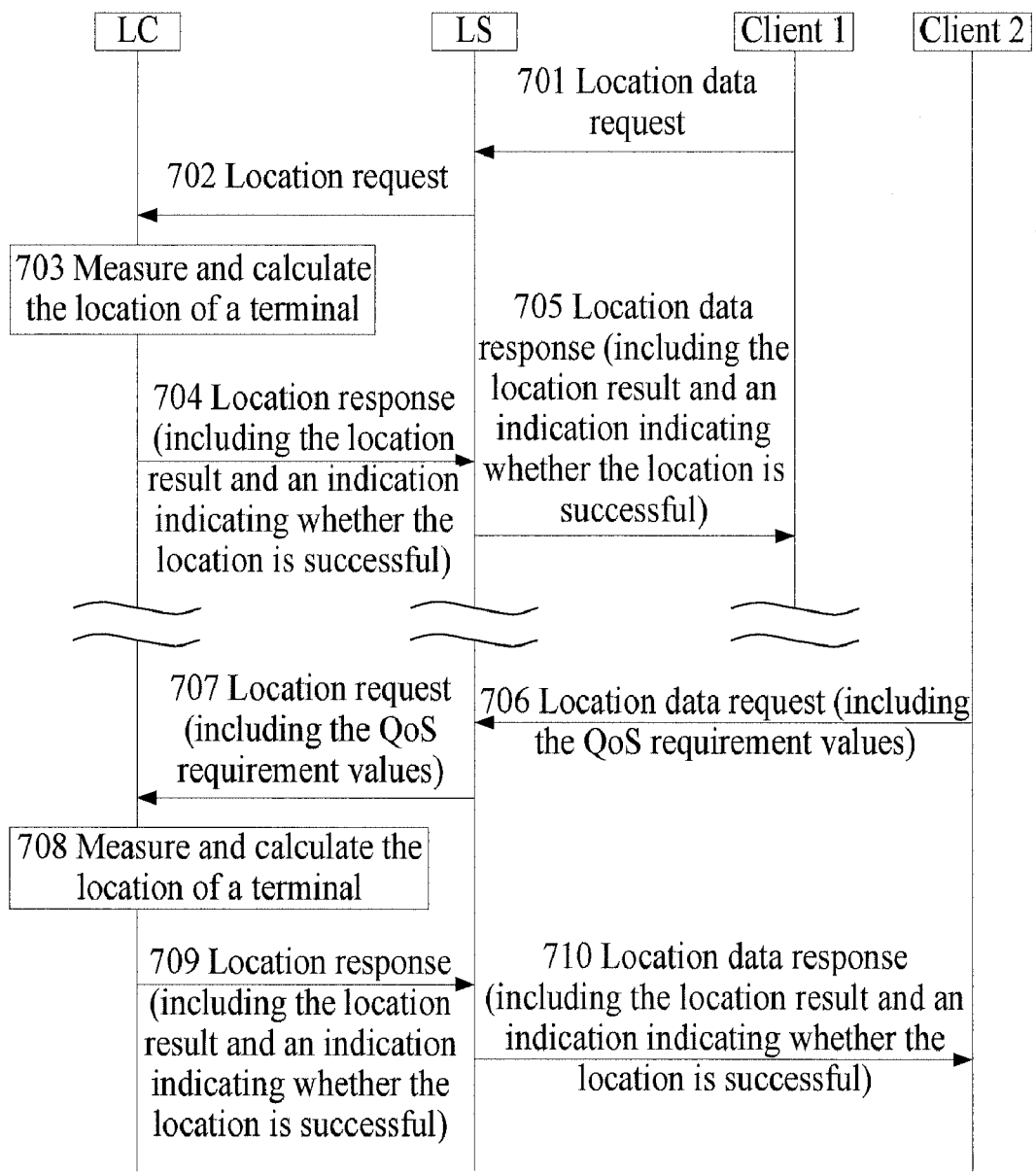
FIG. 7 is a flow chart of a method for implementing a location-based service according to another embodiment of the present invention.

FIG. 7 is a flow chart of a method according to another embodiment of the present invention. In the embodiment, an LS receives a location data request sent by a client, where the location data request does not include the information about the QoS requirement values. FIG. 7 shows a process that an LC performs location measurement according to the highest QoS requirement, and the LS returns the location result to the client.

In step 701, a client 1 sends a location data request, which indicates that the location of a designated terminal is desired, to the LS, where the location data request does not include the QoS requirement values, indicating that the network is required to provide the location result of the highest QoS.

In step 702, the LS sends a location request to the LC.

In step 703, the LC triggers the network to perform location measurement towards the designated terminal, and obtains the measurement data and the location result according to a location method that is capable of providing the highest QoS currently.

In step 704, the LC sends a location response to the LS, where the location response includes the location result and an indication indicating whether the location is successful. Because the QoS requirement values are not specified, if the LC obtains the location data, the location success indication is returned; if the LC has not obtained the location data, the location failure indication is returned.

In step 705, the LS sends a location data response to the client 1, where the location data response includes the location result and the indication indicating whether the location is successful. The location result and the indication are obtained through step 704.

In step 706, a client 2 sends a location data request, which indicates that the location of a designated terminal is desired, to the LS, where the location data request includes the QoS requirement values. The QoS requirement values cover all QoS options including the location precision, the location delay, and the like.

It should be noted that the execution order between step 705 and step 706 is not limited, and they are numbered as 705 and 706 just for illustrating the location of different clients. Steps 706 to 710 show that the present invention is also compatible with the existing implementing process of the QoS request.

In step 707, the LS sends a location request to the LC, where the location request includes the QoS requirement values in the location data request.

In step 708, the LC selects a location method according to the QoS requirement values, triggers the network to perform location measurement towards the designated terminal, and obtains the measurement data and the location result.

In step 709, the LC sends a location response to the LS, where the location response includes the location result and an indication indicating whether the location is successful. Because the present invention is compatible with the existing QoS request mechanism, if the location result meets the QoS requirement values, a location success indication is returned; if the location result does not meet the QoS requirement values, a location failure indication is returned.

In step 710, the LS sends a location data response to the client 2, where the location data response includes the location result and the indication indicating whether the location is successful. The location result and the indication are obtained through step 709.

Figure 8:
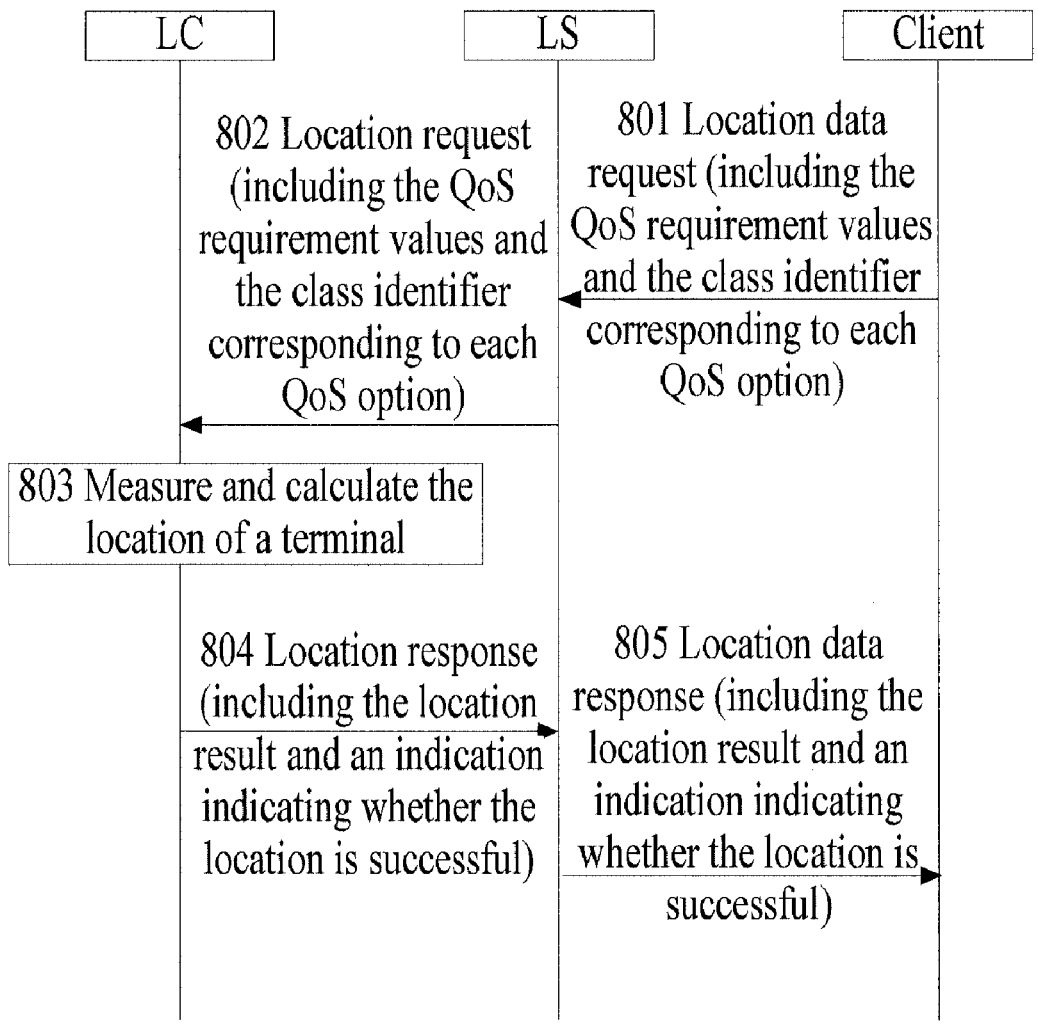
FIG. 8 is a flow chart of a method for implementing a location-based service according to another embodiment of the present invention.

FIG. 8 is a flow chart of a method according to another embodiment of the present invention. In the embodiment, an LS receives QoS requirements sent by a client, and the class of the QoS requirements may be the best effort QoS requirement or the guaranteed QoS requirement. FIG. 8 shows a process that each option in the QoS requirement values is set with a different QoS class identifier respectively, and the LS sends the QoS to an LC.

In step 801, the client sends a location data request, which indicates that the location of a designated terminal is desired, where the location data request includes QoS requirement values. The QoS requirement values can include multiple QoS options, such as the vertical precision, the horizontal precision, and the location delay. Each of the QoS options is set with a class identifier respectively. For example, the identifier of the guaranteed QoS can be set for the vertical precision and the horizontal precision, and the identifier of the best effort QoS can be set for the location delay. All of the following steps are described by taking the setting as the example. Definitely, the QoS options may also use other setting combinations.

In step 802, the LS sends a location request to the LC, where the location request includes the QoS requirement values and the class identifier corresponding to each QoS option in the location data request.

In step 803, the LC selects a location method according to the QoS requirement values, triggers the network to perform location measurement towards the designated terminal, and obtains the measurement data and the location result.

In step 804, the LC sends a location response to the LS, where the location response includes the location result and an indication indicating whether the location is successful.

For example, the vertical precision and the horizontal precision are set with the identifier of the guaranteed QoS, and the location delay is set with the identifier of the best effort QoS. The following situations may occur. If the location result of the vertical precision and the horizontal precision meets the QoS requirement values thereof, a location success indication is returned regardless whether the result of the location delay meets the QoS requirement value thereof. If the location result of either the vertical precision or the horizontal precision does not meet the QoS requirement value thereof, a location failure indication is returned regardless whether the result of the location delay meets the QoS requirement value thereof.

In step 805, the LS sends a location data response to the client, where the location data response includes the location result and the indication indicating whether the location is successful. The location result and the indication are obtained through step 804.

Figure 9:
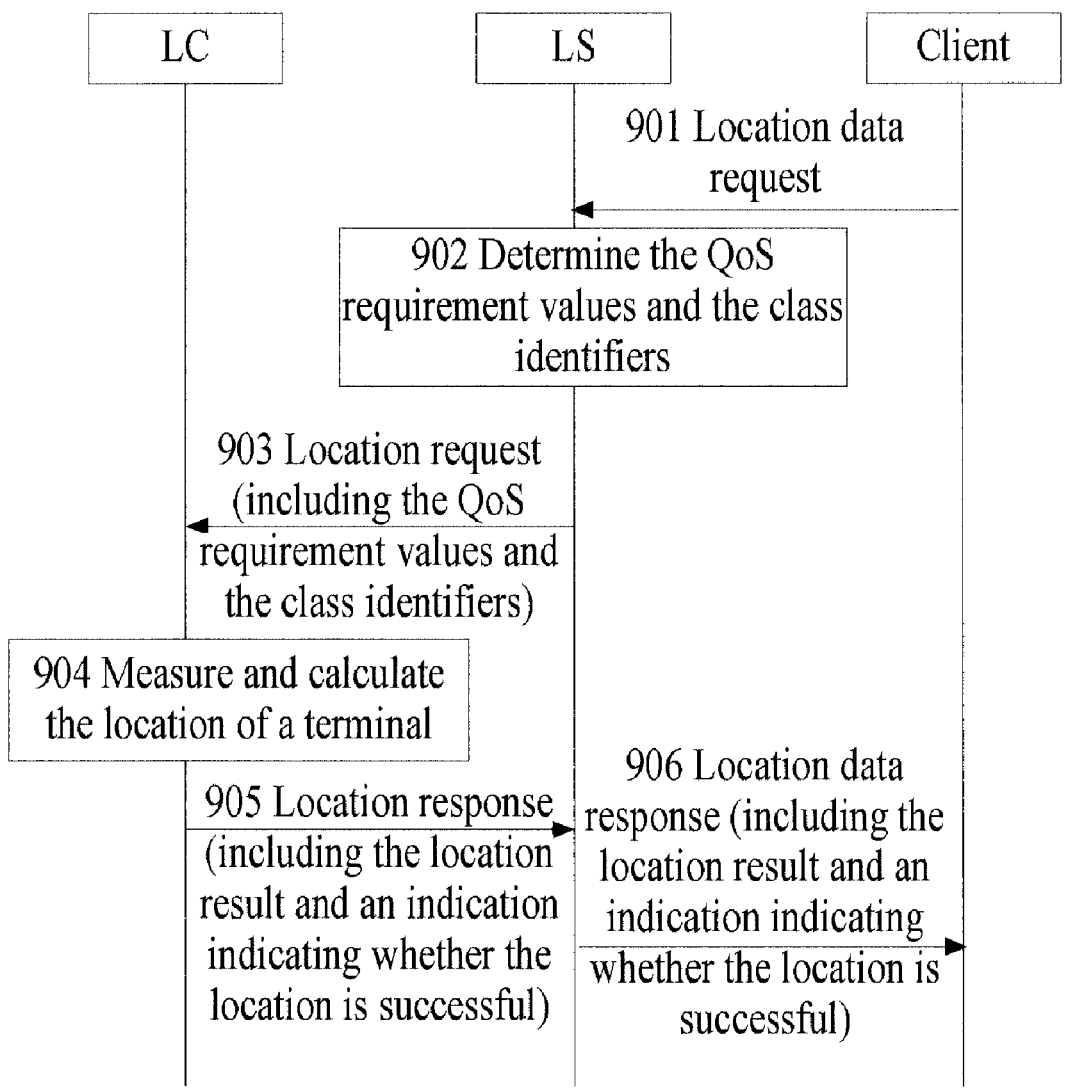
FIG. 9 is a flow chart of a method for implementing a location-based service according to another embodiment of the present invention.

FIG. 9 is a flow chart of a method according to another embodiment of the present invention. In the embodiment, an LS determines QoS requirement values and classes. The QoS requirement values and classes are directed to different QoS options. Definitely, the QoS requirement values and classes may also be set through the methods described in other embodiments. FIG. 9 shows a process that an LC performs location and returns the location result to the LS according to the QoS requirement values and classes sent by the LS.

In step 901, a client sends a location data request, which indicates that the location of a designated terminal is desired, to the LS, where the location data request does not include QoS requirement values or class identifiers.

In step 902, the LS determines the QoS requirement values and the corresponding class identifiers in the location data request according to the information provided by the client, the user terminal subscription information, or the network capability status.

It should be noted that, in step 901 the client may also only include either the QoS requirement values or the class identifiers in the sent location data request. Correspondingly, the LS determines the other one.

In step 903, the LS sends a location request to the LC, where the location request includes the QoS requirement values and the corresponding class identifiers.

In step 904, the LC selects a location method according to the QoS requirement value, triggers the network to perform location measurement towards the designated terminal, and obtains the measurements and the location result.

In step 905, the LC sends a location response to the LS, where the location response includes the location result and an indication indicating whether the location is successful. Specifically, when the location result fails to meet one of the QoS requirement values, if the class identifier corresponding to this value is the identifier of the best effort QoS, the location success indication is returned; if the class identifier corresponding to this value is the identifier of the guaranteed QoS, the location failure indication is returned.

In step 906, the LS sends a location data response to the client, where the location data response includes the location result and the indication indicating whether the location is successful.

Figure 10:
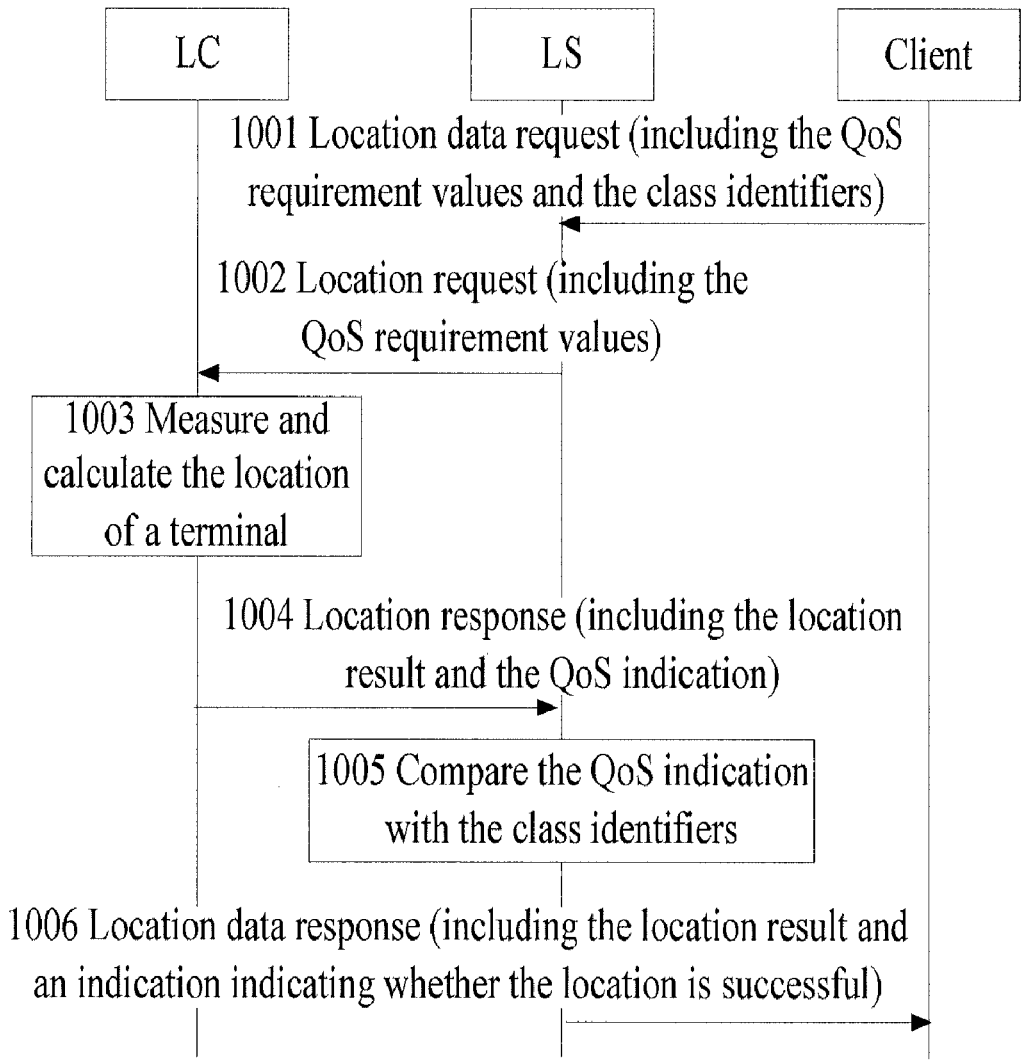
FIG. 10 is a flow chart of a method for implementing a location-based service according to another embodiment of the present invention.

FIG. 10 is a flow chart of a method according to another embodiment of the present invention. In the embodiment, an LS receives QoS requirement values and classes sent by a client, the class of the QoS requirements may be the best effort QoS requirement or the guaranteed QoS requirement, and the value of each QoS requirement class covers all QoS options. FIG. 10 shows a process that the LS only sends the QoS requirement values to an LC, and sends a location data response to the client according to a location result returned by the LC.

In step 1001, the client sends a location data request, which indicates that the location of a designated terminal is desired, to the LS, where the location data request includes the QoS requirement values and the class identifier. The QoS requirement values include multiple QoS options, and the class identifier may be the identifier of the best effort QoS or the identifier of the guaranteed QoS.

In step 1002, the LS sends a location request to the LC, where the location request only includes the QoS requirement values.

In step 1003, the LC selects a location method according to the QoS requirement values, triggers the network to perform location measurement towards the designated terminal, and obtains the measurement data and the location result.

In step 1004, the LC sends a location response to the LS, where the location response includes the location result. Furthermore, the location report may also include a QoS indication configured to indicate that the QoS requirement is satisfied when the obtained location result meets the QoS requirement values, or to indicate that the QoS requirement is not satisfied when the obtained location result does not meet the QoS requirement values.

In step 1005, the LS compares the QoS indication with the class identifier.

In step 1006, the LS sends a location data response to the client, where the location data response includes the location result and the indication indicating whether the location is successful.

According to the comparison result in step 1005, the following two situations may occur: when the QoS indication meets the QoS requirement, regardless whether the class identifier is the identifier of the best effort QoS or the identifier of the guaranteed QoS, the location success indication is returned; when the QoS indication does not meet the QoS requirement, if the class identifier is the identifier of the best effort QoS, the location success indication is returned, and if the class identifier is the identifier of the guaranteed QoS, the location failure indication is returned.

Figure 11:
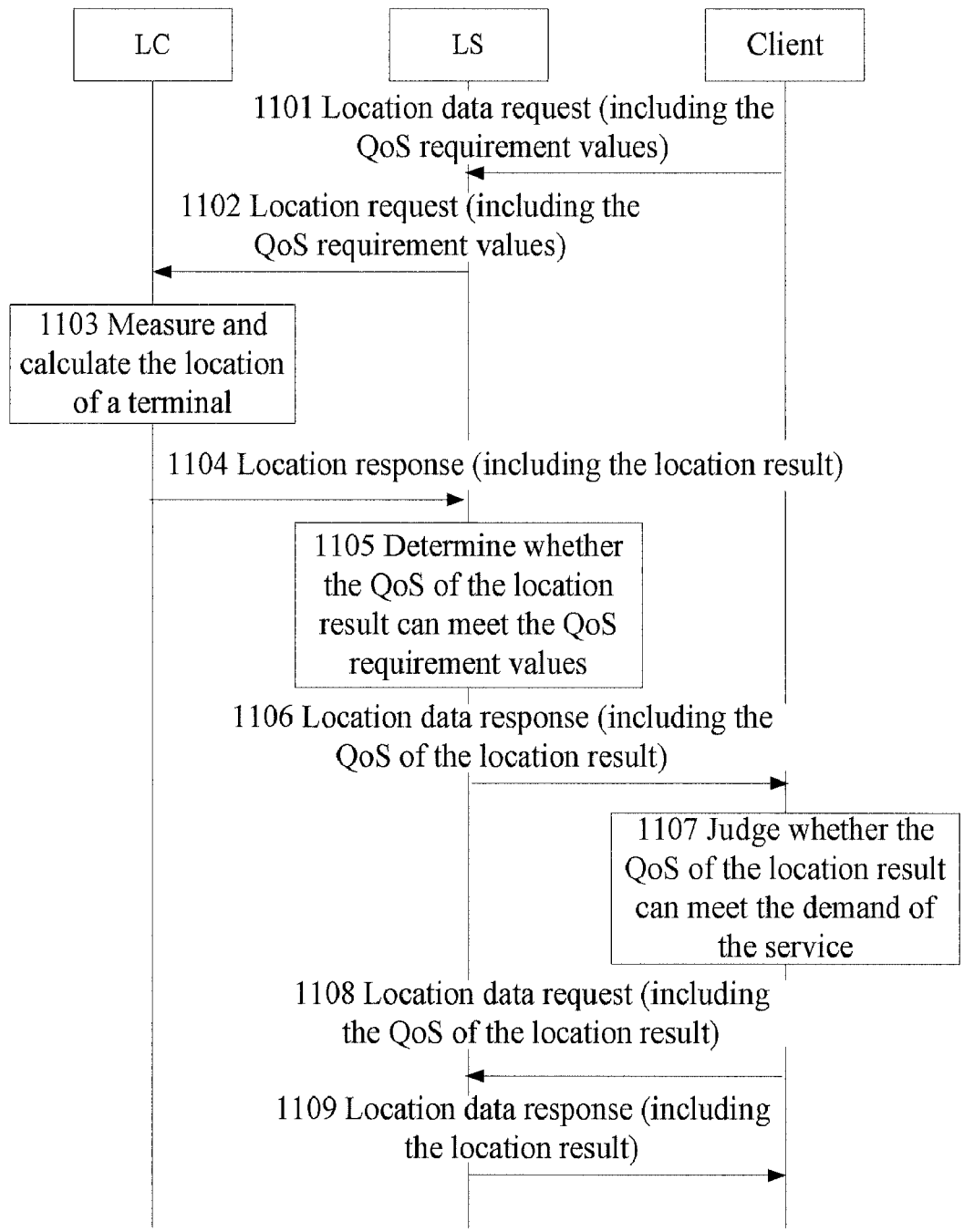
FIG. 11 is a flow chart of a method for implementing a location-based service according to another embodiment of the present invention.

FIG. 11 is a flow chart of a method according to another embodiment of the present invention. In the embodiment, an LS receives QoS requirement values sent by a client, and when the location result returned by an LC does not meet the QoS requirement values, the QoS of the location result is sent to the client. FIG. 11 shows the process that the client chooses whether to obtain the location result according to the QoS of the location result.

In step 1101, the client sends a location data request, which indicates that the location of a designated terminal is desired to the LS, where the location data request includes QoS requirement values.

In step 1102, the LS sends a location request to the LC, where the location request includes the QoS requirement values.

In step 1103, the LC selects a location method according to the QoS requirement values, triggers the network to perform location measurement towards the designated terminal, and obtains the measurement data and the location result.

In step 1104, the LC sends a location response to the LS, where the location response includes the location result.

In step 1105, after receiving the location result, the LS determines whether the QoS of the location result can meet the QoS requirement values sent by the client through comparison.

If the QoS of the location result does not meet the QoS requirement values, step 1106 is performed; if the QoS of the location result meets the QoS requirement values, the location result is sent to the client directly.

In step 1106, the LS sends a location data response to the client, where the location data response includes the QoS of the location result.

In step 1107, the client judges whether the QoS of the location result can meet the demand of the current service according to the QoS of the location result. If the demand of the current service can be met, step 1108 is performed. If the demand of the current service still cannot be met, the process is ended.

In step 1108, the client sends a location data request to the LS again, where the location data response includes the QoS of the location result.

In step 1109, the LS sends a location data response to the client, where the location data response only includes the location result returned by the LC.

In the embodiments described above, both the location request and the location response transmitted between the LS and the LC may also be transmitted through other network elements in the network. For example, be forwarded by the AAA in the CSN, which will not be described in detail here.

In the implementation of the embodiments of the present invention, a location server satisfies the service having no specific requirements for the QoS of the location result by flexibly determining the sent QoS requirement information, so that the network can determine the QoS of the location result according to its own location capability. Thus, the location capability of the network is fully utilized, and at the same time the flexibility of a location service QoS request is improved.

Corresponding to the embodiments of the method for implementing a location-based service, the present invention also provides an embodiment of a system for implementing a location-based service.

Figure 12:
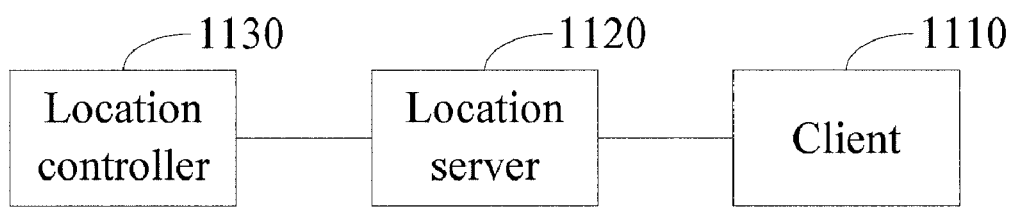
FIG. 12 is a block diagram of a system for implementing a location-based service according to an embodiment of the present invention.

FIG. 12 is a block diagram of a system for implementing a location-based service according to an embodiment of the present invention. The system includes a client 1110, a location server 1120 and a location controller 1130.

The client 1110 is configured to send a location data request to the location server. The location server 1120 is configured to determine QoS requirement information, send a location request to the location controller according to the QoS requirement information, and send location information to the client according to a location response returned by the location controller after receiving the location data request sent by the client, where the location response includes location measurement information. The location controller 1130 is configured to perform location measurement on a corresponding terminal according to the location request, and return the location response including the location measurement information to the location server.

The location process in the embodiment of the system for implementing a location-based service of the present invention is consistent with the description of the method embodiments of the present invention, and will not be described in detail here.

Corresponding to the embodiments of the method and system for implementing a location-based service, the present invention also provides the embodiments of a location server and a location controller respectively.

Figure 13:
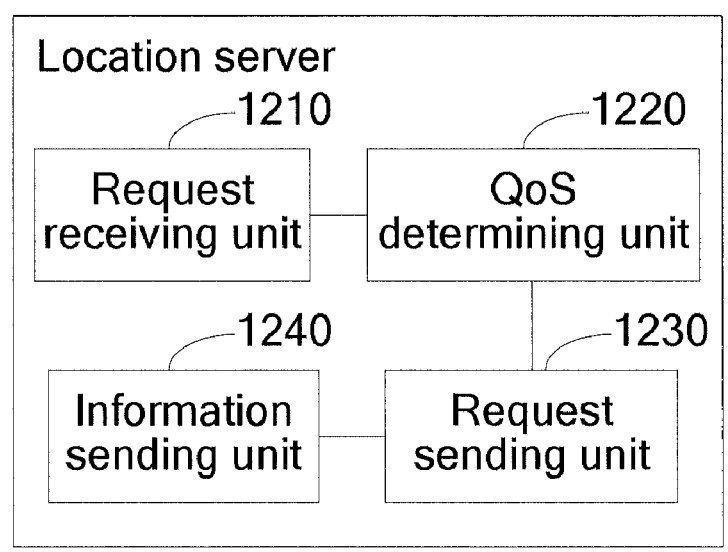
FIG. 13 is a block diagram of a location server according to an embodiment of the present invention.

FIG. 13 is a block diagram of a location server according to an embodiment of the present invention. The server includes a request receiving unit 1210, a QoS determining unit 1220, a request sending unit 1230 and information sending unit 1240.

The request receiving unit 1210 is configured to receive a location data request sent by a client. The QoS determining unit 1220 is configured to determine QoS requirement information after receiving the location data request. The request sending unit 1230 is configured to send a location request to a location controller according to the QoS requirement information. The information sending unit 1240 is configured to send location information to the client according to a location response returned by the location controller, where the location response includes location measurement information.

Specifically, the QoS determining unit 1220 may be a first determining unit configured to obtain the QoS requirement information according to the location data request including the QoS requirement information, or a second determining unit configured to generate the QoS requirement information according to characteristics of a service of the client, subscription information of a location terminal or location capability of the network.

Figure 14:
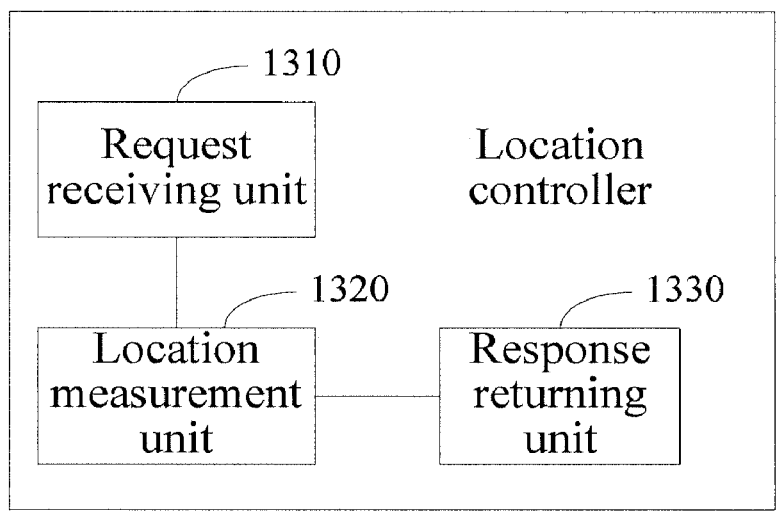
FIG. 14 is a block diagram of a location controller according to an embodiment of the present invention.

FIG. 14 is a block diagram of a location controller according to an embodiment of the present invention. The controller includes, a request receiving unit 1310, a location measurement unit 1320 and a response returning unit 1330.

The request receiving unit 1310 is configured to receive a location request sent according to determined QoS requirement information by a location server. The location measurement unit 1320 is configured to perform location measurement on a corresponding terminal according to the location request. The response returning unit 1330 is configured to return a location response including location measurement information to the location server.

From the description of the embodiments of the present invention, it should be understood that, because a location server does not need to directly forward QoS requirement values sent by a client, but flexibly determines the QoS requirement information to be sent, the services having no specific requirements for the QoS of the location result are satisfied, so that the network can determine the QoS of the location result according to its own location capability. Thus, the network location capability is fully utilized, and at the same time the flexibility of a location service QoS request is improved.

Persons of ordinary skill in the art may understand that all or part of the steps of the method according to the embodiments of the present invention may be implemented by a program instructing relevant hardware. The program may be stored in a computer readable storage medium. When the program is run, the following steps are performed: receiving a location data request from a client; sending a location request message including QoS requirement information to a location controller; and sending location information to the client according to a location response returned by the location controller, where the location response includes location measurement information. The storage medium may be a magnetic disk, a Compact Disk Read-Only Memory (CD-ROM), a Read-Only Memory (ROM) or a Random Access Memory (RAM).

Although the invention has been described through some exemplary embodiments, the invention is not limited to such embodiments. It is apparent that those skilled in the art can make various modifications and variations to the invention without departing from the spirit and scope of the invention. The appended claims of the invention are intended to cover those modifications and variations.

What is claimed is:

1. A method for implementing a location-based service, comprising:
  receiving a location data request sent by a client;
  sending a location request message to a location controller, wherein the location request message comprises Quality of Service (QoS) requirement information, the QoS requirement information comprises a QoS requirement value and a QoS class, wherein the QoS requirement value comprises one or more options of vertical precision, horizontal precision, or a location delay, and wherein the QoS class comprises best effort QoS or guaranteed QoS, one or more of the options of the QoS requirement value is set with a respective QoS class; and
  sending location information to the client according to a location response that is returned based upon the QoS requirement value and the QoS class by the location controller.

2. The method according to claim 1, wherein after the receiving the location data request sent by the client, the method further comprises determining the QoS requirement information.

3. The method according to claim 2, wherein the determining the QoS requirement information comprises:
  obtaining the QoS requirement information according to the location data request comprising the QoS requirement information.

4. The method according to claim 2, wherein the determining the QoS requirement information comprises:
  generating the QoS requirement information according to service characteristics of the client, subscription information of a location terminal, or location capability of a network.

5. The method according to claim 1, wherein the QoS requirement information further comprises a QoS requirement range, wherein the QoS requirement range comprises a lower limit of the QoS, or comprises a lower limit of the QoS and an upper limit of the QoS.

6. The method according to claim 5, wherein the QoS requirement value comprises at least two options, wherein each of the at least two options is set with a respective QoS class.

7. The method according to claim 1, wherein the sending of the location request message to the location controller according to the QoS requirement information comprises:
sending the location request message consistent with the QoS requirement information to the location controller.

8. The method according to claim 1, wherein
if the QoS class is the guaranteed QoS, the sending of the location information to the client comprises: returning a location result to the client if the location result meets the QoS requirement value, and returning a location failure indication to the client if the location result does not meet the QoS requirement value; or
if the QoS class is the best effort QoS, the sending of the location information to the client comprises: returning the location result to the client.

9. The method of claim 8, wherein the method further comprises:
returning a location success indication to the client if the QoS class is the guaranteed QoS and the location result meets the QoS requirement value; or
returning the location success indication to the client if the QoS class is the best effort QoS.

10. The method according to claim 5, wherein the QoS requirement range comprises the lower limit of the QoS, and the sending of the location information to the client comprises:
returning a location success indication and a location result to the client if the location result is not lower than the lower limit of the QoS, and returning a location failure indication to the client if the location result is lower than the lower limit of the QoS.

11. The method according to claim 1, wherein the sending of the location information to the client comprises:
if the QoS class is the guaranteed QoS, returning a location success indication and a location result to the client according to a QoS success indication if the location result meets the QoS requirement value, and returning a location failure indication to the client according to a QoS failure indication if the location result does not meet the QoS requirement values; or
if the QoS class is the best effort QoS, returning a location success indication and a location result to the client according to a QoS success indication.

12. The method according to claim 1, wherein the location response comprises a location result, and the method further comprises comparing a QoS of the location result with the QoS requirement value,
wherein the sending the location information to the client comprises:
if the QoS class is the guaranteed QoS, returning a location success indication and the location result to the client if the QoS of the location result meets the QoS requirement value, and returning a location failure indication to the client if the QoS of the location result does not meet the QoS requirement value; or
if the QoS class is the best effort QoS, returning a location success indication and the location result to the client.

13. The method according to claim 5, wherein the location response comprises a location result, and the method further comprises comparing a QoS of the location result with the QoS requirement value,
wherein when the QoS requirement range comprise the lower limit of the QoS, the sending of the location information to the client comprises:
returning a location success indication and the location result to the client if the QoS of the location result is not lower than the lower limit of the QoS, and returning a location failure indication to the client if the QoS of the location result is lower than the lower limit of the QoS; or
returning the QoS of the location result to the client if the QoS of the location result does not meet the QoS requirement value.

14. The method according to claim 13, wherein after the returning the QoS of the location result to the client, the method further comprises:
receiving the location data request sent by the client, wherein the location data request comprises information needed for the client to determine the QoS of the location result to meet demand of a current service; and
returning a location data response comprising the location result to the client.

15. A system for implementing a location-based service, comprising:
a client is configured to send a location data request to a location server;
the location server is configured to send a location request message comprising Quality of Service (QoS) requirement information to a location controller after receiving the location data request sent by the client, and send location information to the client according to a location response returned by the location controller, wherein the QoS requirement information comprises a QoS requirement value and a QoS class, wherein the QoS requirement value comprises one or more options of vertical precision, horizontal precision, or a location delay, and wherein the QoS class comprises best effort QoS or guaranteed QoS, one or more of the options of the QoS requirement value is set with a respective QoS class; and
the location controller is configured to perform location measurement on a corresponding terminal according to the location request message, and return the location response to the location server based upon the QoS requirement value and the QoS class.

16. A location server, comprising:
a request receiving unit, configured to receive a location data request sent by a client;
a request sending unit, configured to send a location request message comprising Quality of Service (QoS) requirement information to a location controller, wherein the QoS requirement information comprises a QoS requirement value and a QoS class wherein the QoS requirement value comprises one or more options of vertical precision, horizontal precision, or a location delay, and wherein the QoS class comprises best effort QoS or guaranteed QoS, one or more of the options of the QoS requirement value is set with a respective QoS class; and
an information sending unit, configured to send location information to the client according to a location response returned based upon the QoS requirement value and the QoS class by the location controller.

17. The location server according to claim 16 further comprising:

a QoS determining unit, configured to determine QoS requirement information after the request receiving unit receives the location data request.

18. The location server according to claim 17, wherein the QoS determining unit comprises:

a first determining unit, configured to obtain the QoS requirement information according to the location data request comprising the QoS requirement information.

19. The location server according to claim 17, wherein the QoS determining unit comprises:

a second determining unit, configured to generate the QoS requirement information according to service characteristics of the client, subscription information of a location terminal or location capability of a network.

* * * * *